United States Patent
Park

(10) Patent No.: US 11,308,192 B2
(45) Date of Patent: Apr. 19, 2022

(54) DEVICE FOR TRANSMITTING AUTHENTICATION INFORMATION BY USING ULTRASONIC WAVES

(71) Applicant: MUZLIVE INC., Seoul (KR)

(72) Inventor: Jong Sung Park, Seoul (KR)

(73) Assignee: MUZLIVE INC., Seoul (KR)

( * ) Notice: Subject to any disclaimer, the term of this patent is extended or adjusted under 35 U.S.C. 154(b) by 0 days.

(21) Appl. No.: 17/297,674

(22) PCT Filed: May 29, 2020

(86) PCT No.: PCT/KR2020/006957
§ 371 (c)(1),
(2) Date: May 27, 2021

(87) PCT Pub. No.: WO2020/246751
PCT Pub. Date: Dec. 10, 2020

(65) Prior Publication Data
US 2021/0382976 A1  Dec. 9, 2021

(30) Foreign Application Priority Data
Jun. 4, 2019 (KR) .................. 10-2019-0065824

(51) Int. Cl.
*G10L 25/51* (2013.01)
*G06F 21/35* (2013.01)
(Continued)

(52) U.S. Cl.
CPC .............. *G06F 21/35* (2013.01); *G06F 11/10* (2013.01); *G10K 11/00* (2013.01); *H04B 11/00* (2013.01)

(58) Field of Classification Search
CPC ....... H04L 63/126; H04B 11/00; G10L 25/51; G10K 11/00
See application file for complete search history.

(56) References Cited

U.S. PATENT DOCUMENTS

2013/0070566 A1 * 3/2013 Kutsuwada .......... H04W 12/06
367/199
2014/0050321 A1   2/2014 Albert et al.

FOREIGN PATENT DOCUMENTS

JP  2000-056872 A    2/2000
JP  2000056872 A  *  2/2000
(Continued)

OTHER PUBLICATIONS

"UltraSonic Watch: Seamless Two-Factor Authentication Through Ultrasound"—Zarafeta et al, HCI Group, University of Patras, Mar. 9, 2019 https://www.ckatsini.com/files/zarafeta2019ultrasonic.pdf (Year: 2019).*

(Continued)

*Primary Examiner* — Randy A Scott
(74) *Attorney, Agent, or Firm* — Harness, Dickey & Pierce, P.L.C.

(57) ABSTRACT

A device for transmitting authentication information is disclosed. A device for transmitting authentication information, according to one embodiment of the present invention, comprises: a storage unit for storing authentication information and frequency information corresponding to letters or numbers included in the authentication information; a control unit for generating sound wave signals having a frequency corresponding to the letters or numbers included in the authentication information; and a sound wave output unit for outputting the sound wave signal, wherein the control unit sequentially generates, in the order in which the letters or numbers are enumerated, sound wave signals having a frequency corresponding to the letters or numbers included in the authentication information, and repeatedly generates, a preset number of times, a sound wave signal having a frequency corresponding to each letter or number.

4 Claims, 2 Drawing Sheets

(51) Int. Cl.
*G06F 11/10* (2006.01)
*G10K 11/00* (2006.01)
*H04B 11/00* (2006.01)
H04L 29/06 (2006.01)
H04L 29/08 (2006.01)

(56) References Cited

FOREIGN PATENT DOCUMENTS

| JP | 2005056872 A | * | 3/2005 | ......... H01L 29/4925 |
| KR | 10-2006-0056334 A | | 5/2006 | |
| KR | 10-1744851 B1 | | 6/2017 | |
| KR | 10-1755648 B1 | | 7/2017 | |

OTHER PUBLICATIONS

"Sound-Proof: Usable Two-Factor Authentication Based on Ambient Sound"—Karapanos et al, 24th USENIX Security Symposium, Aug. 24, 2015 https://www.usenix.org/system/files/conference/usenixsecurity15/sec15-paper-karapanos.pdf (Year: 2015).*
International Search Report from corresponding PCT Application No. PCT/KR2020/006957, dated Aug. 25, 2020.
Office Action from corresponding Korean Patent Application No. 10-2019-0065824, dated Sep. 7, 2020.
Notice of Allowance from corresponding Korean Patent Application No. 10-2019-0065824, dated Mar. 25, 2021.

* cited by examiner

| Number of Consecutive Arrangements | 1 | 2 | 3 | 4 | ... |
|---|---|---|---|---|---|
| Number of Generations of Sound Wave Signal | 2~3 times | 4~6 times | 7~8 times | 9~11 times | ... |

DEVICE FOR TRANSMITTING AUTHENTICATION INFORMATION BY USING ULTRASONIC WAVES

CROSS-REFERENCE TO RELATED APPLICATIONS

This application is a national phase application of PCT Application No. PCT/KR2020/006957, filed on May 29, 2020, which claims benefit of Korean Patent Application No. 10-2019-0065824, filed on Jun. 4, 2019. The entire disclosure of the applications identified in this paragraph are incorporated herein by references.

TECHNICAL FIELD

The present invention relates to a device for transmitting authentication information using ultrasonic waves and, more particularly, to an authentication information transmission device that transmits authentication information using a sound wave signal of an inaudible frequency.

BACKGROUND ART

Cultural technology narrowly refers to technology necessary for the planning, development, and production of various types of cultural content such as movies, games, and animations, but broadly refers to overall technology that improves the quality of cultural life based on science and technology.

Along with the development of such cultural technology, a new type of content delivery medium that broke away from the existing method began to appear. For example, in the album market, USB-type albums or albums of types that allow connection to an AUX terminal of smartphones began to appear in order to replace traditional CD-type albums.

Such a new type of album is distributed in the form of selling a storage medium in which authentication information is stored. When a user who has purchased a storage medium in which authentication information is stored connects the storage medium to a terminal device such as a smartphone or a tablet PC and then executes a corresponding application, music content corresponding to the authentication information is downloaded from a server to the terminal device.

However, recent smartphones, tablet PCs, etc. are released with traditional interfaces such as an AUX terminal being removed therefrom. In the case of using the above interfaces, authentication information stored in a storage medium cannot be transmitted to a user terminal device.

A method of transmitting authentication information to a user terminal device through a wireless communication network interface such as Wi-Fi or Bluetooth may be considered. However, in this case, a wireless communication network module should be included in a storage medium in which the authentication information is stored, and also it takes a predetermined time to establish a pairing between the user terminal device and the storage medium, which causes inconvenience to users.

Accordingly, for new types of albums, there is a need for a new type of authentication device and authentication method capable of transmitting authentication information stored in a storage medium to a user terminal device in a non-contact manner.

SUMMARY

Technical Problem

The present invention has been designed to solve the above-described problems, and an object of the present invention is to provide an authentication device capable of transmitting authentication information stored in a storage medium in a new type of album to a user terminal device in a non-contact manner.

Also, another object of the present invention is to provide an authentication information transmission device using ultrasonic waves capable of minimizing the occurrence of errors at a receiving side when authentication information is transmitted using an inaudible frequency.

Technical Solution

In order to achieve the above objects, an authentication information transmission device using ultrasonic waves according to an embodiment of the present invention includes a storage unit configured to store authentication information and frequency information corresponding to letters or numbers included in the authentication information, a control unit configured to generate sound wave signals with frequencies corresponding to the letters or numbers included in the authentication information, and a sound wave output unit configured to output the sound wave signals, wherein the control unit sequentially generates the sound wave signals with the frequencies corresponding to the letters or numbers included in the authentication information in the order in which the letters or numbers are arranged, and the control unit repeatedly generates the sound wave signal with the frequency corresponding to each letter or number a predetermined number of times.

According to an embodiment of the present invention, by repeatedly generating a sound wave signal of a specific frequency for several periods, the control unit may repeatedly generate the sound signal of the specific frequency a predetermined number of times.

According to an embodiment of the present invention, by selecting, from a predetermined range, a sound wave signal corresponding to the number of times a letter or number included in the authentication information is consecutively arranged, the control unit may repeatedly generate the sound wave signal a predetermined number of times.

According to an embodiment of the present invention, the control unit may control the frequency of the sound wave signal by adjusting a turn-on time of a pulse signal within one period.

According to an embodiment of the present invention, the period of the sound wave signal may be a multiple of the period of a generated pulse signal.

Advantageous Effects

According to the above-described device for transmitting authentication information using ultrasonic waves, it is possible to minimize the occurrence of errors at a receiving side when authentication information is transmitted using an inaudible frequency.

Also, a sound wave signal of various frequencies can be generated by adjusting the period of a pulse signal without an analog-to-digital converter (ADC), and thus it is possible to lower the manufacturing costs of an authentication device.

DETAILED DESCRIPTION

Figure 1:
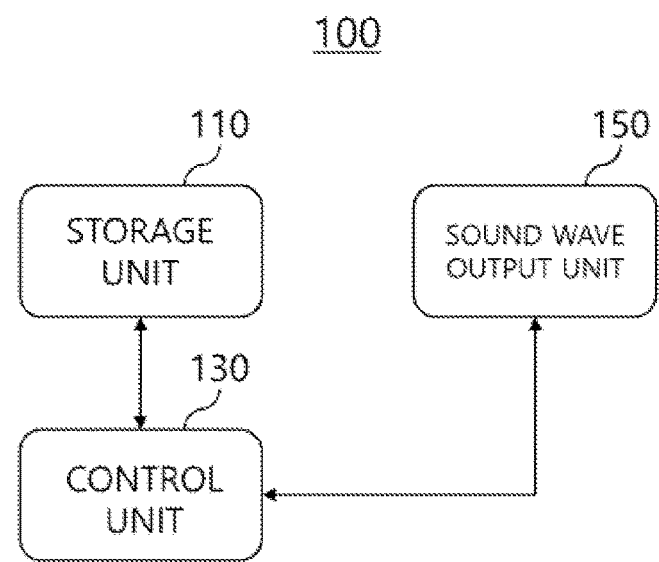
FIG. 1 is a functional block diagram illustrating an authentication information transmission device using ultrasonic waves according to an embodiment of the present invention.

Hereinafter, preferred embodiments of the present invention will be described in detail with reference to the accompanying drawings. Advantages and features of the present invention, and implementation methods thereof will be clarified through the following embodiments described in detail with reference to the accompanying drawings. However, the present invention is not limited to the embodiments disclosed below and may be implemented in various different forms. The exemplary embodiments are provided only for completing the disclosure of the present invention and for fully indicating the scope of the present invention to those skilled in the art. The scope of the present invention is defined only by the claims. Like reference numerals refer to like elements throughout.

Unless otherwise defined, all terms (including technical and scientific terms) used herein have the same meaning as commonly understood by one of ordinary skill in the art to which this invention belongs. Also, terms defined in commonly used dictionaries should not be interpreted in an idealized or overly formal sense unless expressly so defined herein.

Also, the singular forms are intended to include the plural forms as well, unless the context clearly indicates otherwise. The terms "comprises" and/or "comprising" as used herein specify the presence of stated elements, steps, operations, and/or components but do not preclude the presence or addition of one or more other elements, steps, operations, and/or components.

FIG. 1 is a functional block diagram illustrating an authentication information transmission device using ultrasonic waves according to an embodiment of the present invention.

An authentication information transmission device 100 using ultrasonic waves according to an embodiment of the present invention includes a storage unit 110, a control unit 130, and a sound wave output unit 150. In FIG. 1, only elements associated with an embodiment of the present invention are shown. Accordingly, it is to be understood by those skilled in the art that general-purpose elements other than the elements shown in FIG. 1 may be further included.

The storage unit 110 stores authentication information and frequency information corresponding to letters or numbers included in the authentication information.

The authentication information refers to information necessary to download content such as music and video from a server. According to an embodiment of the present invention, the authentication information may be a combination of a plurality of letter strings or number strings.

Also, the storage unit 110 may store the frequency information corresponding to the letters or numbers included in the authentication information. The frequency information corresponding to the letters or numbers may be stored in the form of a lookup table.

For example, information indicating that a frequency corresponding to the number "1" is 5 MHz and a frequency corresponding to the letter "a" is 7 MHz may be stored in the form of a lookup table.

The control unit 130 generates a sound wave signal with a frequency corresponding to a letter or number included in the authentication information.

The control unit 130 according to an embodiment of the present invention may generate a sound wave signal with various frequencies by changing an output time of an output voltage or output current pulse when the sound wave signals are generated.

Specifically, the control unit 130 may generate a sound wave signal with various frequencies by using a DC power source as an input power source and changing the time at which DC power is applied. Therefore, even when an expensive digital-to-analog converter (DAC) is not provided, it is possible to generate a sound wave signal with various frequencies.

Also, the control unit 130 according to an embodiment of the present invention sequentially generates sound wave signals of frequencies corresponding to letters or numbers included in the authentication information in the order in which the letters or numbers are arranged, and a sound wave signal with a frequency corresponding to each letter or number may be repeatedly generated a predetermined number of times.

For example, when authentication information to be transmitted is A12, the control unit 130 initially generates a sound wave signal with a frequency corresponding to the letter "A" with reference to the frequency information stored in the storage unit 110 and then sequentially generates sound wave signals of frequencies corresponding to the numbers "1" and "2."

In the above-described example, when the authentication information is A12, it has been described as an example that a sound wave signal of a frequency corresponding to each letter or number is generated in the order of "A," "1," and "2," but it will be appreciated that the sound wave signals of the frequencies may be generated in the order of "2," "1" and "A."

Also, repeatedly generating a sound wave signal with a frequency corresponding to each letter or number a predetermined number of times means that the sound wave signal of the frequency corresponding to the corresponding letter or number is generated such that the sound wave signal is repeated for a plurality of periods.

For example, when the frequency corresponding to the letter "A" included in the authentication information is 10 MHz, the control unit 130 may generate a sound wave signal of 10 MHz corresponding to the letter "A" such that the sound wave signal is repeated a predetermined number of times in order to transmit the letter "A."

Here, repeatedly generating a sound wave signal a predetermined number of times means that a sound wave signal of a specific frequency is generated such that the sound signal is repeated for several periods.

As described above, when authentication information is transmitted using ultrasonic waves, the reason a sound wave signal with a frequency corresponding to a letter or number included in the authentication information is repeatedly generated several times is to minimize the occurrence of errors at a client side that receives the authentication information.

The sound wave output unit 150 outputs a sound wave signal generated by the control unit. The sound wave output unit 150 according to an embodiment of the present invention, which may be implemented as a speaker, converts an electrical signal generated by the control unit 130 into vibration of a diaphragm to generate waves of condensation and rarefaction and thus output sound waves.

A method of transmitting authentication information using ultrasonic waves will be described below in more detail.

Figure 2:
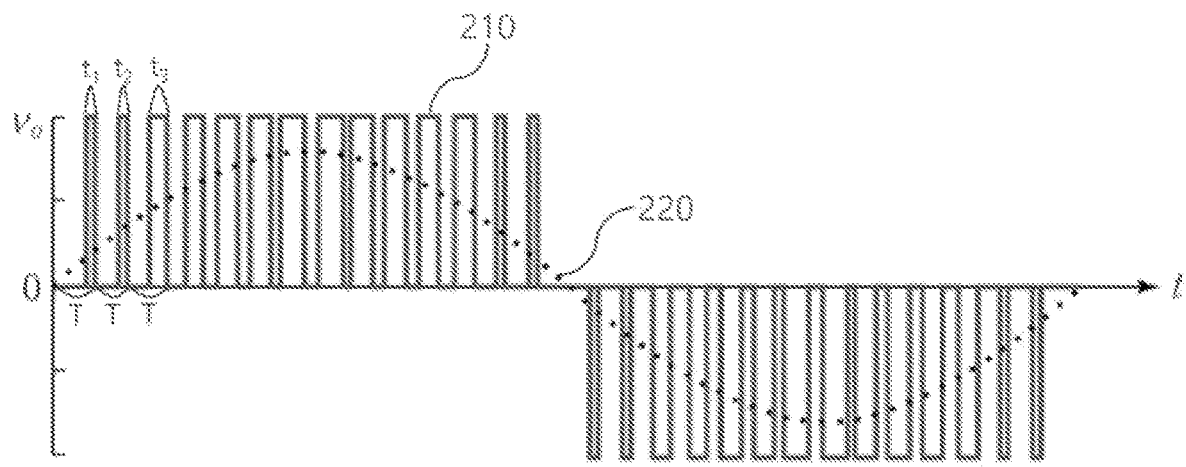
FIG. 2 is a diagram illustrating a process of a control unit generating a sound wave signal with various frequencies according to an embodiment of the present invention.

FIG. 2 is a diagram illustrating a process of a control unit generating a sound wave signal with various frequencies according to an embodiment of the present invention.

As described above, the control unit 130 may generate a sound wave signal with various frequencies by changing an output time of an output voltage or output current pulse when the sound wave signals are generated.

In FIG. 2, a first waveform 210 is a pulse output by the control unit 130 to generate a sound wave signal, and a second waveform 220 is a sound wave signal generated by the control unit 130.

When it is assumed that the period of the pulse output to generate the sound wave signal is T, the control unit 130 generates a sound wave signal with various frequencies by adjusting the turn-on time of the pulse signal within one period.

For example, first, a pulse in FIG. 2 is turned on during t1 within one period and is kept turned off during the remaining time. During the next period, the pulse is kept turned on during t2, which is longer than t1.

By changing the turn-on time of the pulse within one period by repeating this process, the control unit 130 may generate a sound wave signal identical to the second waveform 220. Also, by controlling the degree to which the turn-on time changes, the control unit 130 may generate a sound wave signal with a frequency different from that of the second waveform 220.

In this case, the period of the sound wave signal generated by the control unit 130 is a multiple of the period of the pulse signal generated by the control unit 130 in order to generate the sound wave signal. This is because the control unit 130 needs to generate a pulse signal a plurality of times in order to generate a sound wave signal in one period.

For example, a central processing unit (CPU) operating at 16 MHz has a pulse signal period of 1/16,000,000 seconds, and thus the control unit 130 needs a plurality of pulse signals in order to generate a sound wave signal in one period. As a result, the sound wave signal in one period has a multiple of the pulse signal period as one period value.

When a sound wave signal is generated in the scheme described with reference to FIG. 2, it is possible to generate a sound wave signal with various frequencies without a separate DAC.

Figures 3, 4:
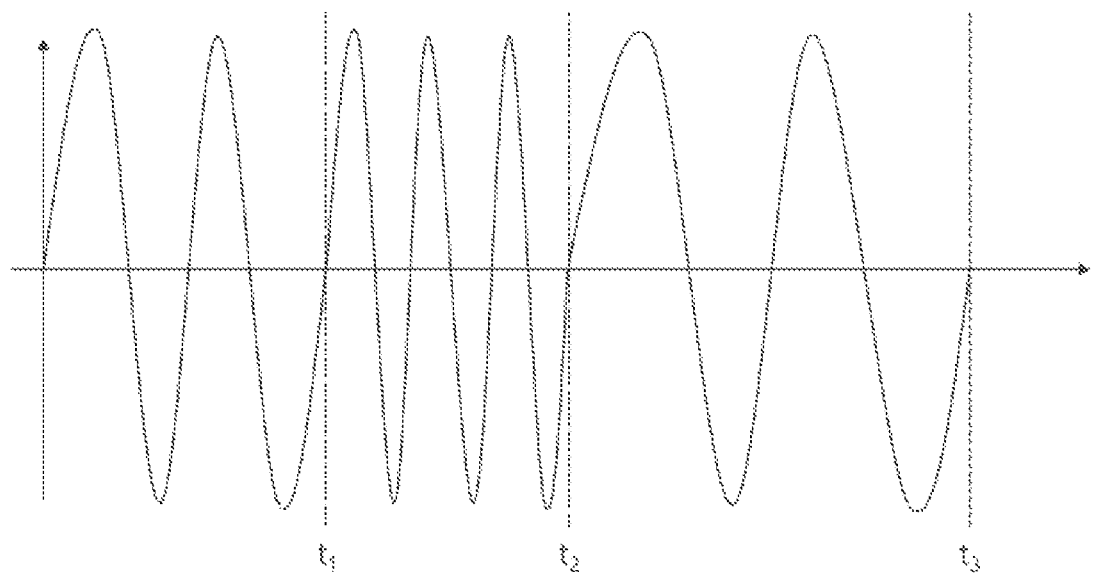
FIG. 3 is a diagram illustrating a sound wave signal with a frequency corresponding to a letter or number included in authentication information according to an embodiment of the present invention.
FIG. 4 is a diagram illustrating the number of times a letter or number is consecutively arranged and the number of generations of a corresponding sound wave signal according to an embodiment of the present invention.

FIG. 3 is a diagram illustrating a sound wave signal with a frequency corresponding to a letter or number included in authentication information according to an embodiment of the present invention.

Specifically, a sound wave signal shown in FIG. 3 is a sound wave signal with various frequencies generated by the control unit 130 by changing the pulse output time of the output voltage or the output current.

The following description assumes that in the waveform shown in FIG. 3, the frequency of the wave sound signal is f1 in the section 0<t<t1, f2 in the section t1<t<t2, and f3 in the section t2<t<t3.

Also, the following description assumes that f1 is a frequency corresponding to the letter "A," f2 is a frequency corresponding to the number "1," and f3 is a frequency corresponding to the number "2."

To transmit authentication information A12, the control unit 130 generates a sound wave signal with a frequency corresponding to a letter or number included in the authentication information as shown in FIG. 3.

In this case, the control unit 130 may perform control such that a sound wave signal with a frequency corresponding to each letter or number is repeated a predetermined number of times. Specifically, the control unit 130 may consecutively generate a sound wave signal of a specific frequency corresponding to the number of times a specific letter or number is consecutively arranged.

In this case, the number of generations of the sound signal corresponding to the number of times a specific letter or number is consecutively arranged may be determined within a predetermined range.

For example, when a specific letter or number is arranged only once in the authentication information, a sound wave signal of a specific frequency is generated within the range of 2 or 3 times.

In the example shown in FIG. 3, when the authentication information A12 is to be transmitted, a sound wave signal with a frequency of f1 corresponding to the letter "A" is repeated twice and then output. Here, a sound wave signal of a specific frequency being repeated several times means that a signal in one period is generated by being repeated a plurality of times.

Likewise, a sound wave signal with a frequency of f2 corresponding to the number "1" in order to transmit the number "1" in the second digit of the authentication information is consecutively generated three times, and a sound wave signal with a frequency of f3 corresponding to the number "2" in order to transmit the number "2" in the last digit is consecutively generated twice.

As described above, the reason a sound wave signal of a corresponding frequency is repeatedly generated for several periods to transmit one letter or number is to minimize the occurrence of errors caused by a receiving side that receives the corresponding sound wave signal not being able to receive a signal of a specific frequency corresponding to one period due to external sound and the like.

Also, the reason for selecting one number of times from numbers of times belonging to a predetermined range and then generating a sound wave signal rather than repeating a sound wave signal a fixed number of times in order to transmit a specific letter or number is to minimize errors that may occur at a receiving side.

A method of determining the number of generations of a sound wave signal corresponding to the number of times a specific letter or number is consecutively arranged from a predetermined range and a reason for the determination will be described below in detail.

FIG. 4 is a diagram illustrating the number of times a letter or number is consecutively arranged and the number of generations of a corresponding sound wave signal according to an embodiment of the present invention.

A storage unit 110 of an authentication information transmission device 100 according to an embodiment of the present invention may store information as shown in FIG. 4 in the form of a lookup table.

Referring to FIG. 4, it is assumed that authentication information to be transmitted by the authentication information transmission device 100 is 122333444. First, the number "1" in the first digit is arranged only once, and thus a sound wave signal of a frequency corresponding to the number "1" is consecutively generated two or three times.

Therefore, when the frequency corresponding to the number "1" is consecutively received two or three times, a receiving end that receives the sound wave signal may sense that the number "1" is included only once.

After the number "1" included in the authentication information, the number "2" is consecutively arranged two times, and thus the control unit 130 repeatedly generates a sound wave signal of a frequency corresponding to the number "2" either four times to six times according to the lookup table shown in FIG. 4.

Likewise, the number "3" is consecutively arranged three times, and thus the control unit 130 repeatedly generates a sound wave signal with a frequency corresponding to the number "3" either seven times or eight times according to the lookup table shown in FIG. 4.

As described above, the reason a sound wave signal is repeatedly generated one number of times selected from numbers of times belonging to a predetermined range rather than a sound wave signal is repeatedly generated a specific number of times corresponding to the number of consecutive repetitions of a specific letter or number is that when a sound wave signal is repeatedly generated a specific number of times and an error occurs in a specific section at a receiving side, the number of repetitions of a specific frequency that is subsequently received is also changed.

According to the above-described method of transmitting authentication information using ultrasonic waves, it is possible to accurately transmit the authentication information while minimizing the occurrence of errors at a receiving side.

Those skilled in the art related to the embodiments can understand that various changes in form and details may be made therein without departing from the essential characteristics of the above description. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

What is claimed is:

1. An authentication information transmission device for transmitting authentication information using ultrasonic waves to minimize the occurrence of errors at a receiving side when the authentication information is transmitted using an inaudible frequency, the device comprising:
    a storage unit configured to store authentication information, frequency information corresponding to letters or numbers included in the authentication information, and a number of times a repetition of frequency corresponding to a number of times a consecutively arranged letter or number included in the authentication information;
    a control unit configured to generate sound wave signals with frequencies corresponding to the letters or numbers included in the authentication information; and
    a sound wave output unit configured to output the sound wave signals,
    wherein the control unit repeatedly generates the sound wave signals for several periods with the frequencies corresponding to the letters or numbers included in the authentication information in the order in which the letters or numbers are arranged, and
    wherein the number of times a repetition of frequency corresponding to the number of times a consecutively arranged letter or number is included in the authentication information.

2. The device of claim 1, wherein by repeatedly generating a sound wave signal of a specific frequency for several periods, the control unit repeatedly generates the sound signal of the specific frequency a predetermined number of times.

3. The device of claim 1, wherein the control unit controls the frequency of the sound wave signal by adjusting a turn-on time of a pulse signal within one period.

4. The device of claim 3, wherein the period of the sound wave signal is a multiple of the period of a generated pulse signal.

* * * * *